(12) United States Patent
Wahl

(10) Patent No.: US 9,779,257 B2
(45) Date of Patent: Oct. 3, 2017

(54) ORCHESTRATED INTERACTION IN ACCESS CONTROL EVALUATION

(71) Applicant: MICROSOFT TECHNOLOGY LICENSING, LLC, Redmond, WA (US)

(72) Inventor: Mark Wahl, Austin, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 88 days.

(21) Appl. No.: 13/719,416

(22) Filed: Dec. 19, 2012

(65) Prior Publication Data

US 2014/0173755 A1    Jun. 19, 2014

(51) Int. Cl.
| | |
|---|---|
| G06F 21/00 | (2013.01) |
| G06F 21/60 | (2013.01) |
| G06F 21/62 | (2013.01) |
| H04L 29/06 | (2006.01) |

(52) U.S. Cl.
CPC ........ *G06F 21/604* (2013.01); *G06F 21/6218* (2013.01); *H04L 63/10* (2013.01); *G06F 2221/2115* (2013.01)

(58) Field of Classification Search
CPC ...... G06F 21/335; G06F 21/10; G06F 21/604; G06F 21/6218; G06F 2221/2115; H04L 63/10; H04L 67/1008; H04L 67/1034
See application file for complete search history.

(56) References Cited

U.S. PATENT DOCUMENTS

| | | | |
|---|---|---|---|
| 7,856,448 B2 | 12/2010 | Sheehan | |
| 2002/0169650 A1* | 11/2002 | Dougherty | G06Q 30/02 705/38 |

(Continued)

FOREIGN PATENT DOCUMENTS

| | | |
|---|---|---|
| CN | 1881245 A | 12/2006 |
| CN | 101836185 A | 9/2010 |
| CN | 101931655 A | 12/2010 |
| WO | 2009055083 A1 | 4/2009 |

OTHER PUBLICATIONS

Baishya, Ankur, "SAP ® Business Objects™ Access Control 10 and SAP Net Weaver® Identity Management", Retrieved at <<http://www.sdn.sap.com/irj/scn/go/portal/prtroot/docs/library/uuid/60e7bc69-0bbc-2e10-bf82-9a66c5279574?QuickLink=index&overridelayout=true&52235392266071>>, Retrieved Date: Apr. 23, 2012, pp. 1-17.

(Continued)

*Primary Examiner* — Kendall Dolly
(74) *Attorney, Agent, or Firm* — Alleman Hall Creasman & Tuttle LLP

(57) ABSTRACT

An orchestrated access system is described herein that provides an access control decision function that is augmented by interfacing with a real-time collaborative communication system that maintains a state of various users' availability to communicate. The orchestrated access system provides real-time approvals for access control scenarios where the policy would not otherwise grant access. The system provides an experience for the requesting user to select an appropriate approver among multiple potential approvers based on the relationship of the potential approver to the requesting user, the relationship of the potential approver to the resource, and the availability of the potential approver for real-time communication. The system can provide a record of approver and request parameters in a database to optimize further interactions. Thus, the orchestrated access system provides an improved experience for granting access to resources within an organization for both the requesting user and the approver(s).

17 Claims, 4 Drawing Sheets

(56) References Cited

U.S. PATENT DOCUMENTS

| | | | |
|---|---|---|---|
| 2005/0114674 A1 | 5/2005 | Carley | |
| 2006/0173698 A1* | 8/2006 | Morley | G06F 17/30507 705/7.36 |
| 2006/0293914 A1* | 12/2006 | Fukuoka | 705/1 |
| 2009/0313079 A1* | 12/2009 | Wahl | 705/9 |
| 2009/0320088 A1* | 12/2009 | Gill et al. | 726/1 |
| 2011/0302622 A1 | 12/2011 | Bregman et al. | |
| 2012/0079124 A1 | 3/2012 | Ribot | |
| 2012/0278289 A1 | 11/2012 | Urano et al. | |

OTHER PUBLICATIONS

Bauer, et al., "A User Study of Policy Creation in a Flexible Access-Control System", Retrieved at <<http://www.cs.unc.edu/~reiter/papers/2008/CHI1.pdf>>, CHI 2008, Apr. 5, 2008, pp. 1-10.

Crampton, et al., "A Framework for the Modular Specification and Orchestration of Authorization Policies", Retrieved at <<http://www.doc.ic.ac.uk/~mrh/security/CramptonNordSec10.pdf>>, Nordsec 2010, Oct. 27, 2010, pp. 1-16.

Lin, et al., "Policy Decomposition for Collaborative Access Control", Retrieved at <<http://web.mst.edu/~lindan/publication/policy_decompostion.pdf>>, SACMAT '08, Jun. 11, 2008, pp. 103-112.

Ferraiolo, et al., "Role-Based Access Controls", Retrieved at <<http://csrc.nist.gov/rbac/ferraiolo-kuhn-92.pdf>>, 15th National Computer Security Conference (1992), Baltimore MD, Mar. 30, 2004, pp. 1-11.

ISA European Patent Office, International Search Report and Written Opinion Issued in Application No. PCT/US2013/075518, Apr. 30, 2014, WIPO, 10 pages.

The State Intellectual Property Office of China, First Office Action and Search Report Issued in Chinese Patent Application No. 201380066864.7, dated Mar. 30, 2017, China, 14 pages. (Submitted with partial English translation of First Office Action and Search Report).

* cited by examiner

ORCHESTRATED INTERACTION IN ACCESS CONTROL EVALUATION

BACKGROUND

In networked computer systems, controlling access to various resources is a frequent concern. File servers, databases, websites, applications, and other resources may contain confidential information or data that is not intended to be provided to everyone that can obtain a connection to the information server. Access control refers to the body of software that determines whether any particular requester will be allowed to access any particular resource. In traditional access control, an access control list (ACL) associated with each resource generally contains access control entries (ACE) that specify each entity that will or will not be allowed access. These entities may be users as specified by an operating system or domain controller, groups of users, other computer systems, and so forth.

In enterprise computer systems, when a user requests to access a resource (such as to read a file held on a file server, or to perform a transaction in a business application), an access control decision function (ACDF) will evaluate whether the user's request is to be permitted or denied based on configured access control information. Typically, this function will rely upon a predefined policy, in which the policy references attributes of the user, of the resource, and/or of the request and environmental conditions that will permit access if met. If no policy is found, or if the policy does not grant access, then the user is unable to access the resource. In cases where the policy is incompletely specified, legitimate business activities may be blocked until the policy owner revises the policy. In cases where an organization has a requirement to restrict access based on numerous factors of request parameters or environmental conditions, then a policy may become needlessly complex in order that an automated access control decision function could implement it.

Some systems, such as MICROSOFT™ SHARE-POINT™, have an option for the requestor to send to the resource owner an email at the point when access is denied. If the resource owner agrees with the contents of the email, then the resource owner may change the policy such as to make a one-time grant of access to the requesting user. However, this may introduce unknown delay to the requesting user, who does not know when the resource owner may next read email or how long it will take the resource owner to decide. If the resource owner is currently away from email for an extended period (e.g., on vacation or leave), then the requesting user has no recourse at this point and may not even be aware that no one is actually reviewing the request. This model of communication is no longer aligned to today's expectations for working, in which employees may be assumed to be online most of the time, carrying one or more mobile devices with them.

SUMMARY

An orchestrated access system is described herein that provides an access control decision function that is augmented by interfacing with a real-time collaborative communication system that maintains a state of various users' availability to communicate. The orchestrated access system provides real-time approvals for access control scenarios where the policy would not otherwise grant access. In some embodiments, the system provides a mobile device-oriented experience for the requesting user and the approver. In some embodiments, the system provides an experience for the requesting user to select an appropriate approver among multiple potential approvers based on the relationship of the potential approver to the requesting user, the relationship of the potential approver to the resource, and the availability of the potential approver for real-time communication. This allows the requesting user to make a quick decision about who to send the request to based on how fast the requesting user needs a response and who the requestor knows is likely to understand the context of the request and approve the access. The system may also provide a record of approver and request parameters in a database or other data store to optimize further interactions. Thus, the orchestrated access system provides an improved experience for granting access to resources within an organization for both the requesting user and the approver(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
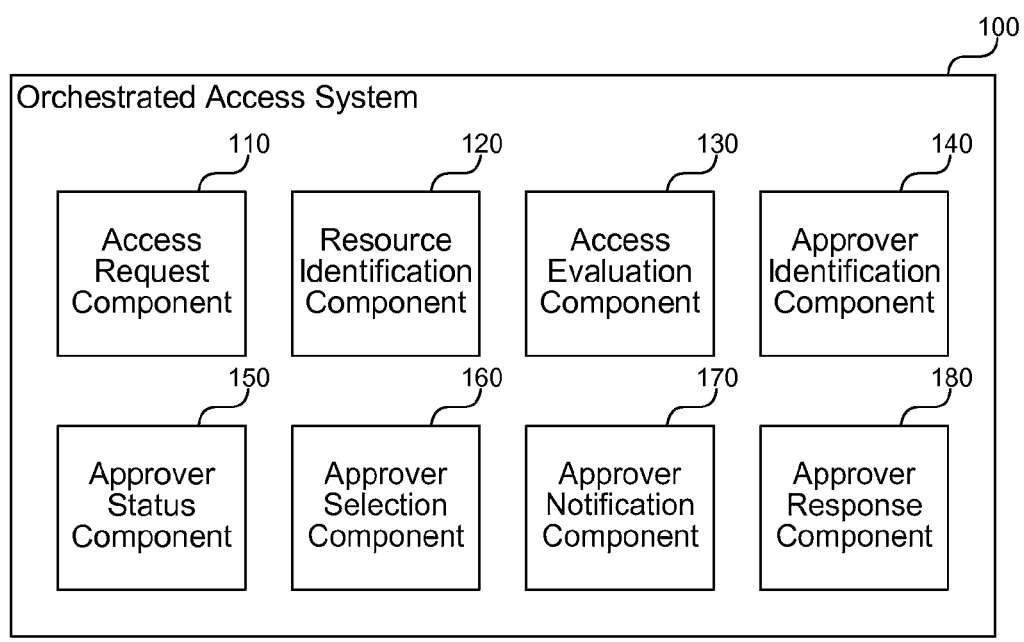
FIG. 1 is a block diagram that illustrates components of the orchestrated access system, in one embodiment.

An orchestrated access system is described herein that provides an access control decision function that is augmented by interfacing with a real-time collaborative communication system that maintains a state of various users' availability to communicate. The orchestrated access system provides real-time approvals for access control scenarios where the policy would not otherwise grant access. In some embodiments, the system provides a mobile device-oriented experience for the requesting user and the approver. For example, an approver may receive a message on his or her smartphone that he or she can immediately approve or deny. In some embodiments, the system provides an experience for the requesting user to select an appropriate approver among multiple potential approvers based on the relationship of the potential approver to the requesting user, the relationship of the potential approver to the resource, and the availability of the potential approver for real-time communication. For example, the system may determine based on presence information that two potential approvers are online, and show the requesting user these two users with a status of "available" along with other approvers with a status of "offline" or "unknown". This allows the requesting user to make a quick decision about who to send the request to based on how fast the requesting user needs a response and who the requestor knows is likely to understand the context of the request and approve the access. The system may also provide a record of approver and request parameters in a database or other data store to optimize further interactions.

The policy database for the ACDF stores relationships between users in an organization or other business model hierarchy, in addition to typical access control rules. For example, the system may store who manages whom, chains of command within an organization, and other business relevant hierarchy. If the ACDF does not find an acceptable policy to grant access, the ACDF will evaluate the hierarchical relationship between the requesting user and the resource owner to find possible approvers. The ACDF will also contact the communication system to determine which of those possible approving users are currently or recently online, available for chat, and so forth. The ACDF will then present to the requesting user the options for whom to contact to request approval, based on the likelihood of an approval being granted quickly. The ACDF will then orchestrate the interaction between the requesting user and the chosen approver, if the approver is available for real-time communication. The ACDF presents a straightforward option for the approver to approve or deny the request based on the context of the request. If the approver grants access, it will be recorded in the database and the user can then proceed with their request. Thus, the orchestrated access system provides an improved experience for granting access to resources within an organization for both the requesting user and the approver(s).

FIG. 1 is a block diagram that illustrates components of the orchestrated access system, in one embodiment. The system 100 includes an access request component 110, a resource identification component 120, an access evaluation component 130, an approver identification component 140, an approver status component 150, an approver selection component 160, an approver notification component 170, and an approver response component 180. Each of these components is described in further detail herein.

The access request component 110 receives a request to access an access-controlled resource in an organization from an identified user associated with the organization. The resource can be any type of entity access-controlled through software by the organization, such as a file server, print server, file folder, file, directory information, website, web page, software application, transaction, physical barrier, or other resource. The user may login to a domain controller or other entity to provide authentication information, such as a user name and password, which identifies the user. Knowing the user's identity and other parameters of the request, of the resource, and of the environment, the system 100 can evaluate whether the user has explicit access to the resource. The request may be received using one or more standard or proprietary protocols either on a local machine or remotely via a network. For example, the request may include a server message block (SMB) request to access a file hosted by a file server, or any other type of request to access a resource.

The resource identification component 120 identifies the resource to which the user requests access. The resource may include the resource itself as well as metadata associated with the resource, such as a directory entry or other location that stores metadata related to the resource, such as which entities have permission to access the resource, as well as which users have authority to grant or deny access to the resource. Many access control systems take a whitelisting approach, so that only those entities that are explicitly in a list of allowed entities can access the resource, though the system 100 can work with other access control schemes. The resource identification component 120 retrieves information describing the resource including which entities can access the resource and which entities can approve access to the resource.

The access evaluation component 130 determines whether the user has an explicit right to access the identified resource. If the user has previously been granted access to the resource, such as by inclusion in an access control list associated with the resource, or if the user is a member of a user group that has been granted access to the resource, and the circumstances of the request are in line with those associated with the explicit grant, then the access evaluation component 130 will determine that the user can access the resource and no further access determining need take place. However, if the component 130 determines that the user does not have explicit access rights to the resource, then the following components become involved to potentially grant the user access to the identified resource. This access may be in the form of a temporary (e.g., time restricted) right to access the resource, or more permanent by adding the user to a list of users or other entities that have explicit access to the resource. In some embodiments, the approver can select what level and/or duration of access is granted to the user, or cause the access evaluation component to enforce other restrictions on any requests subsequently received from that user which would be permitted based on a temporary grant of access.

The approver identification component 140 identifies one or more approvers that have sufficient security privileges to grant the user access to the identified resource following a determination that the user does not already have an explicit right to access the resource. The component 140 determines the list of approvers based on metadata associated with the resource. For example, access-controlled resources often have an associated owner or owner, as well as users with various rights, including administrative rights that allow modifying access to the resource. The system identifies such owners and/or administrators. In some cases, the metadata may identify a group of users that has owner or administrative access, in which case the component 140 may expand the group to identify the individual users that are members of the group. This process may produce many possible approvers, which the system 100 then reduces based on context and availability. Context refers to how likely a particular approver is to understand the request, and may increase with closeness between the approver and the requesting user in an organization hierarchy (e.g., the user's manager has more context about the user's actions than the vice president of the user's division does). Availability refers to current status information that indicates whether a particular user is currently online and potentially available for communication.

The approver status component 150 determines current status information for each of the identified one or more approvers, wherein the status information indicates each approver's availability for communication with the requesting user. The system 100 may interact with other systems, such as an instant messaging system, corporate email and collaboration system, mobile device status system, and so on to determine presence or other status information about each approver. The information may indicate when each approver last logged in, which approvers are actively using a mobile or other computing device, which approvers are currently in meetings, on vacation, or on a call, and other information that bears on the likelihood of a particular approver to be available for responding to the access request. The approver status component 150 may also access context information that relates to the potential of the approver to understand the request. The system 100 may then favor those approvers that are most available and have the most context related to the request. The system 100 can score these two inputs and weight them so that one may have more impact than the other does. The system 100 may provide configuration settings that allow a particular organization to tune how the system 100 weights these and other factors to select approvers. In some cases, the system 100 may reduce the set of possible approvers based on segregation of duties checks, to avoid routing a request to an approver that would not be appropriate based on parameters of the request, or to avoid overburdening a particular user as an approver with excessive inquiries.

The approver selection component 160 selects one or more of the identified approvers for receiving a request to grant access to the identified resource. Depending on how many approvers were identified, the system 100 may not want to bother many approvers with the access request. Where only several approvers are identified, the system 100 may simply select all of them and send the request. However, where potentially dozens, hundreds, or more approvers exist in an organization, the system 100 operates to reduce the identified approvers to a more manageable set, both to reduce interruption to the potential approvers and to assist the requesting user to find someone that will understand the request and be able to quickly determine whether to approve it. As discussed above, the component 160 may factor in availability, context, and other factors to select an appropriate number of approvers. The number of approvers selected may be configurable by an organization.

The approver notification component 170 notifies the selected approvers with information describing the access request, the identified resource, and the requesting user. The notification may use existing communication modes available to the system 100, such as push notifications, email, instant messaging, or other protocols and paradigms for communication between users. In some embodiments, the system component 170 determines one or more notification types appropriate for each selected approver, and uses potentially different notification types for each approver. For example, the component 170 may determine that an email message is most appropriate for an approver in a meeting while a pop up notification is appropriate for an approver at home. The notification may include voting buttons (e.g., "yes", "no" or "approve", "deny" buttons) or other interface through which the approver can provide a response. The interface may also include other options, such as whether the grant of access has any limitations, such as expiring after a set period, or provide the ability for an approver to include a comment that would be included in any audit record associated with the approval or in some cases would be sent to the requesting user as further guidance.

The approver response component 180 process one or more responses from one or more of the selected approvers to either grant or deny access to the identified resource to the requesting user. If an approver elects to approve the access request, then the requesting user is quickly and efficiently granted access, without time consuming hurdles to overcome. The system 100 can receive a request for access, seek approval from an approver, and grant the access, all within seconds versus the longer wait and more complex process that is associated with past systems. This increases organizational efficiency by allowing users to get their jobs done even when they have not previously been granted access to all of the resources they need, and unburdens approvers from pre-defining or understanding convoluted processes for providing access to resources.

The computing device on which the orchestrated access system is implemented may include a central processing unit as a processor, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
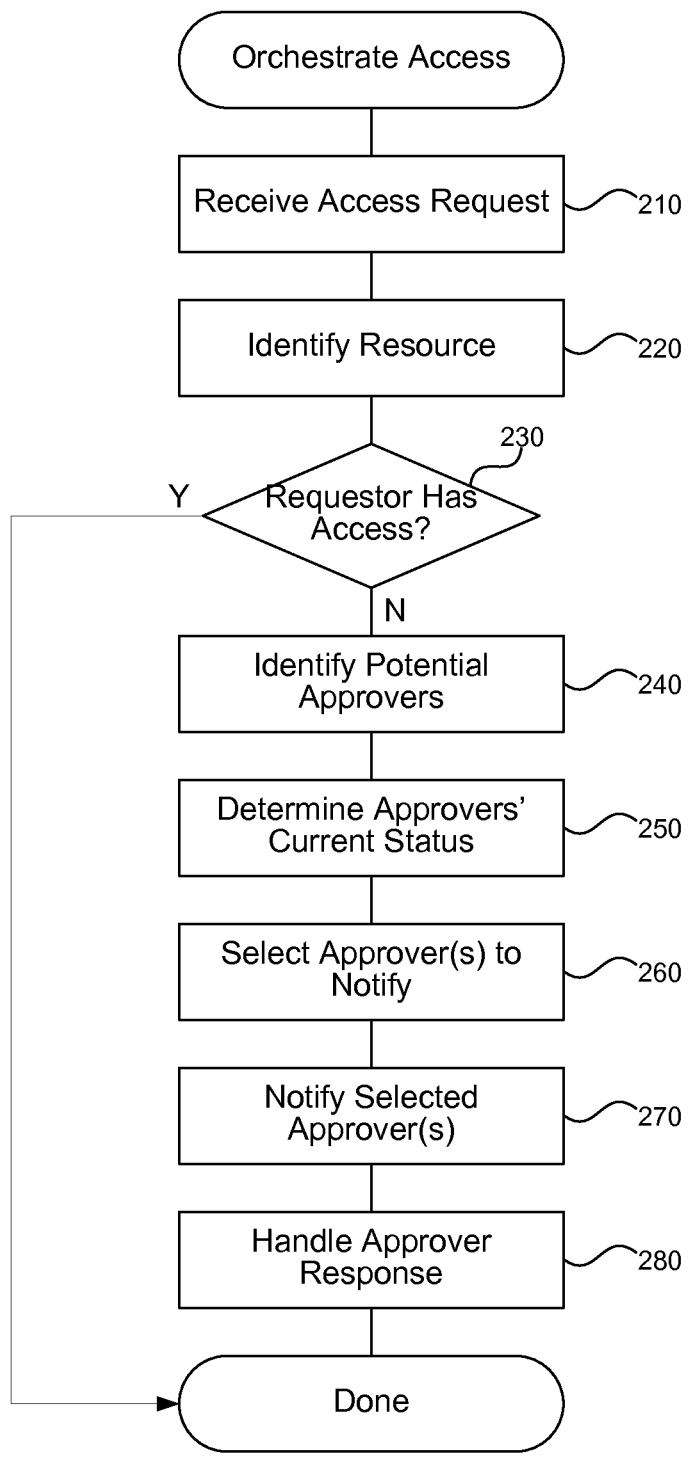
FIG. 2 is a flow diagram that illustrates processing of the orchestrated access system to respond to an attempt from a requesting user to access a resource, in one embodiment.

FIG. 2 is a flow diagram that illustrates processing of the orchestrated access system to respond to an attempt from a requesting user to access a resource, in one embodiment.

Beginning in block 210, the system receives a request to access an access-controlled resource associated with an organization having multiple users. The request may occur at any time from a variety of user activities. For example, the requesting user may attempt to access a file, web page, printer, or other access-controlled resource in the course of completing a task. An access control system enforces security settings for resources within the organization to control access to the resources. For example, many operating systems provide built in access control systems for securing resources, determining which users can access the resources, and producing an audit trail describing access requests.

Continuing in block 220, the system identifies the access-controlled resource that is a subject of the received request. The request itself may identify the resource or the user or context of the user's action may identify which resource the user is trying to access. In conjunction with identifying the resource, the system accesses metadata associated with the resource that identifies which users or other entities have been explicitly granted access to the resource. In cases where the requesting user does not have access, the system may also identify one or more users or other entities that have sufficient authority to grant access to the requesting user. These users are referred to herein as approvers, and may include owners of the resource, administrators, or others with privileges sufficient to approve access to the resource.

Continuing in decision block 230, if the system determines that the requesting user has explicitly been granted access to the identified resource, then the system grants the access and completes. In this simple case, the user already has rights to access the resource, and there is nothing else for the system to do. In other cases where the user does not already have explicit access, the system continues with the following steps to orchestrate granting the user access by contacting one or more approvers to get on-the-fly access to the resource in real or near-real time.

Continuing in block 240, the system identifies one or more approvers that have the authority to grant the requesting user access to the identified resource. The system accesses security metadata associated with the identified resource to determine one or more users in the organization that have the authority to approve the user's request to access the resource. The approvers may be owners of the resource, administrators within the organization, or others. In some cases, the system may allow administrators to define rules, such that when a user is an owner of a resource, that user's manager also has authority to grant access to the resource. This can help in situations where the normal chain of approval is unavailable, such as when a resource owner is on vacation. The definition of who can approve a request may vary by organization, and implementers of the system may customize how approvers are identified.

Continuing in block 250, the system determines a current status of each identified approver, wherein the current status indicates an approver's availability for receiving a communication to quickly handle a decision to grant or deny access to the identified resource. The system may leverage other systems that already manage status of users, such as instant messaging and collaboration systems. These systems typically know whether a given user is online, and may know sub-status information, such as a user's location, which computing device(s) the user is reachable on, whether the user has any current or upcoming meetings or other events that will affect availability, and so forth. The orchestrated access system can leverage these other systems to determine which approvers are readily available, and which may be slower to respond.

Continuing in block 260, the system selects one or more of the identified approvers to receive a notification requesting access to the resource. The system may consider multiple axes of information when selecting approvers, such as context and availability. Availability provides a practical determination of whether the approver is likely to even respond to the request, or to be able to do so quickly. Context provides a determination of whether the approver will understand the request or have sufficient information to know whether the request should be allowed or denied. For example, a user's immediate manager may have significant context into why the user wants access to a resource, whereas the CEO of the company, while having authority to grant access, may have little or no context to know whether the request should be granted for a particular requesting employee. These and other factors allow the system to reduce the list of potential approvers down to a select list of target approvers.

Continuing in block 270, the system sends a notification to the selected approvers inquiring whether the received request to access the identified resource is to be allowed. The notification may include a text description or other information that identifies the user requesting access, the identified resource, the approver's relationship to the requesting user, or other information useful for the approver to understand and provide a decision to the request. The notification may also include user interface controls, such as buttons or other ways for the approver to indicate his or her decision on the request. In some embodiments, the approver may simply send back a message that says, "yes", "no", or other indication of how the request should be answered. The system can then parse this type of response and carry out the approver's instructions.

Continuing in block 280, the system receives a response from at least one approver and if the response indicates that the request should be allowed, allows the requested access to the identified resource. In some embodiments, the system also records details of the interaction in a database or other data store, and may persistently store the outcome so that future requests find that the user has been explicitly granted access to the resource. In other instances, the access may be temporary or may be flagged for a level of review. For example, if the resource owner was unavailable and the resource owner's manager approved the request, the system may inform the resource owner of the events that occurred and allow the resource owner to determine whether the grant should be extended or made permanent. After block 280, these steps conclude.

Figure 3:
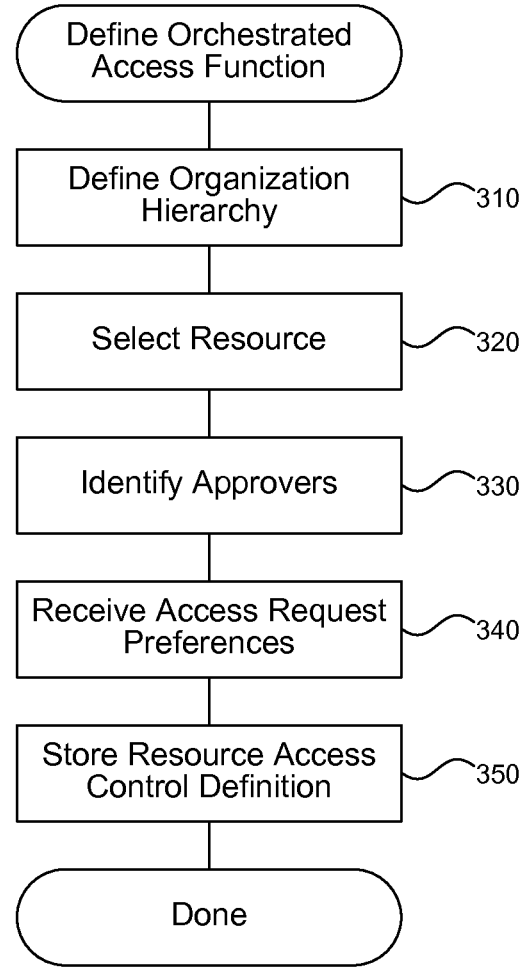
FIG. 3 is a flow diagram that illustrates processing of the orchestrated access system to define approvers for future access to one or more access-controlled resources in an organization, in one embodiment.

FIG. 3 is a flow diagram that illustrates processing of the orchestrated access system to define approvers for future access to one or more access-controlled resources in an organization, in one embodiment.

Beginning in block 310, the system receives organizational hierarchy information that defines relationships between users within the organization, wherein the relationships relate to which users have authority to grant access to the access-controlled resources. For example, many organizations have a concept of each employee within the organization having a manager, up to the CEO that runs the company. For another example, many organizations have a concept of each non-employee user, such as a vendor or contractor, having a sponsor employee in the organization. In general, each higher level of management may have higher privileges to grant access to resources. In some organizations, users of the system may define rules such that a resource owner's manager has at least equal rights to the resource owner to grant access to a resource.

Continuing in block 320, the system receives a selection of a resource for which an administrative user within the organization wants to define approval information for orchestrated access requests. The system may provide a user interface through which the administrative user can browse and select resources. For example, the administrative user may select a file from a file browser, or web page from a web browser, for which the administrative user wants to define approver information.

Continuing in block 330, the system receives an identification of users that are allowed to approve access to the selected resource. In some cases, the approvers may include explicitly defined approvers and implicit approvers. Explicitly defined approvers are those that the administrative user lists specifically (e.g., by user name or user group) to be allowed to approver requests to access the selected resource. Implicit approvers are any other approvers, such as managers of explicitly defined approvers, which also have sufficient authority to grant access to the selected resource.

Continuing in block 340, the system receives one or more access request preferences that define a process for orchestrating ad hoc approval to access the selected resource for a user within the organization that is not already explicitly granted access to the resource. The request preferences may include an order of preferred approvers for granting access, time of day restrictions for which approvers to contact, how far out of the requesting user's own management chain to look for available approvers, and so forth. The access request preferences define any decision logic set by the administrator of the resource in advance of receiving a request to access the resource.

Continuing in block 350, the system stores orchestrated access information in association with the selected resource, including the identified users that are allowed to approve access to the selected resource and the received access request preferences. The system may store orchestrated access information as metadata associated with the resource, such as security settings or other metadata. The system uses the stored information when a user requests access to the resource that has not been explicitly granted access to the resource. After block 350, these steps conclude.

Figure 4:
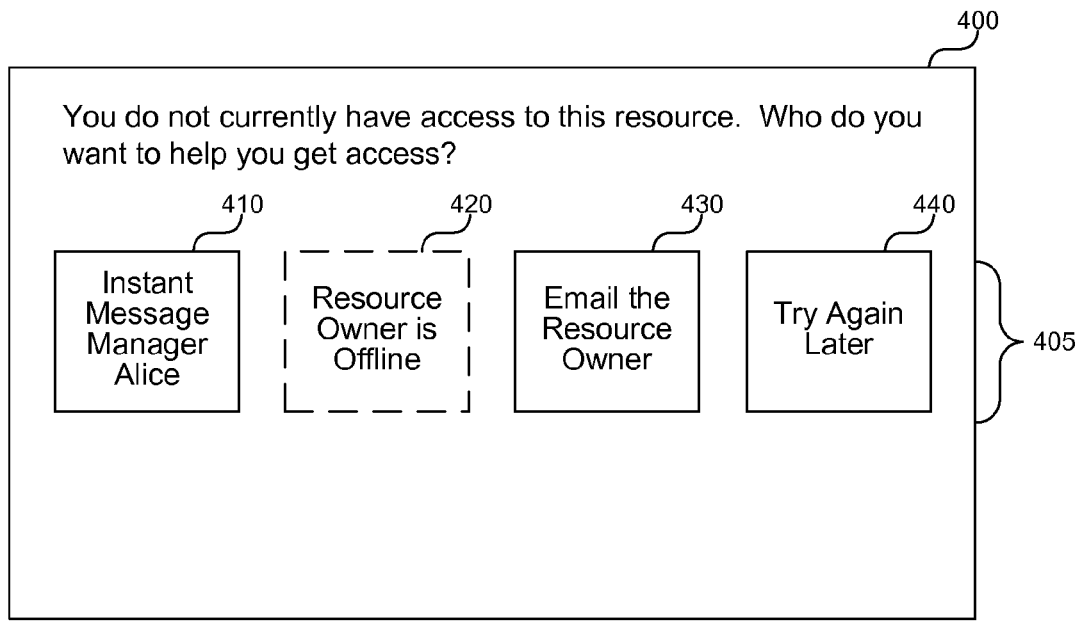
FIG. 4 is a display diagram that illustrates an example interface provided by the orchestrated access system for request access to a resource, in one embodiment.

FIG. 4 is a display diagram that illustrates an example interface provided by the orchestrated access system for request access to a resource, in one embodiment. Following an unsuccessful attempt to access a resource, the system may display dialog 400 to the requesting user. The dialog 400 presents the user with a series of options 405 that the user can select from to attempt to access the resource. Each option may be a button or other control that the user can select. Option 410 offers the requesting user the ability to instant message the user's manager to request access to the resource. Option 420 indicates to the user that the resource owner is offline. Option 430 offers the requesting user the ability to email the resource owner. Had the resource owner been online, the system might offer instant message or other real-time communication to get approval from the resource owner. Finally, option 440 allows the user to cancel the current operation and try again later.

From the foregoing, it will be appreciated that specific embodiments of the orchestrated access system have been described herein for purposes of illustration, but that various modifications may be made without deviating from the spirit and scope of the invention. Accordingly, the invention is not limited except as by the appended claims.

I claim:

1. A method for securing resources, comprising:
   on an access-control computing device, receiving a request from a requesting user's computing device to access an access-controlled resource, the requesting user not having permission to access the access-controlled resource;
   on the access-control computing device, compiling an approver list of one or more approvers having authority to grant access to the access-controlled resource;
   on the access-control computing device, determining a suitability of each of the one or more approvers to respond to a resource access request based on a relationship between the requesting user and each of the one or more approvers, and a current ability of each of the one or more approvers to communicate with the requesting user;
   on the access-control computing device, filtering the approver list to include only suitable approvers;
   on the access-control computing device, sending the filtered approver list to the requesting user's computing device;
   on the access-control computing device, receiving an indication of a preferred approver from the requesting user's computing device, the preferred approver being selected by the requesting user from the filtered approver list;
   on the access-control computing device, sending a resource access request to a computing device of the preferred approver;
   on the access-control computing device, receiving a response from the computing device of the preferred approver; and
   on the access-control computing device, based on the response approving the resource access request, granting access to the access-controlled resource.

2. The method of claim 1 wherein the access-controlled resource is associated with metadata that identifies one or more users that have been explicitly granted access to the access-controlled resource.

3. The method of claim 1 wherein the access-controlled resource is associated with metadata that identifies the one or more approvers having authority to grant access to the access-controlled resource.

4. The method of claim 1 wherein compiling the approver list comprises accessing one or more rules that define which users can act as approvers for the request.

5. The method of claim 1 wherein determining the suitability of each of the one or more approvers comprises accessing an organizational hierarchy to determine the relationship between the requesting user and each of the one or more approvers.

6. The method of claim 1 wherein determining the suitability of each of the one or more approvers comprises applying context information to provide a determination of whether the approver will understand the request and have sufficient information to know whether the request should be allowed.

7. The method of claim 1 wherein sending the resource access request to the preferred approver comprises displaying a user interface to the requesting user to allow the requesting user to select the preferred approver from the filtered approver list wherein the display indicates an availability of each of the one or more approvers.

8. The method of claim 1 wherein sending the resource access request comprises sending a real-time communication to the computing device of the preferred approver.

9. The method of claim 1 wherein sending the resource access request comprises sending a notification that includes user interface controls for the preferred approver to indicate his or her decision on the request.

10. The method of claim 1 wherein receiving the response comprises recording details of the response in a database so that future requests find that the requesting user has been explicitly granted access to the access-controlled resource.

11. The method of claim 1 wherein subsequent to receiving the response from the computing device of the preferred approver, the method further comprises providing the requesting user temporary access to the access-controlled resource.

12. An access-control computing device, comprising:
   a processor and memory configured to execute software instructions embodied within the memory to:
   receive a request from a requesting user's computing device to access an access-controlled resource, the requesting user not having permission to access the access-controlled resource;
   compile an approver list of one or more approvers having authority to grant access to the access-controlled resource;

determine a suitability of each of the one or more approvers to respond to a resource access request based on a relationship between the requesting user and each of the one or more approvers, and a current ability of each of the one or more approvers to communicate with the requesting user;

filter the approver list to include only suitable approvers;

send the filtered approver list to the requesting user's computing device;

receive an indication of a preferred approver from the requesting user's computing device, the preferred approver being selected by the requesting user from the filtered approver list;

send a resource access request to a computing device of the preferred approver;

receive a response from the computing device of the preferred approver; and based on the response approving the resource access request, grant access to the access-controlled resource.

13. The access-control computing device claim 12 wherein metadata associated with the access-controlled resource describes one or more users that have permission to access the access-controlled resource and the one or more approvers having authority to grant access to the access-controlled resource.

14. The access-control computing device claim 12 wherein determining the suitability of each of the one or more approvers comprises determining each approver's context to the request, wherein context refers to how likely a particular approver is to understand the request.

15. The access-control computing device claim 12 wherein the software instructions are further executed to determine presence information associated with each of the one or more approvers that indicates how the approver can presently be reached.

16. The access-control computing device claim 12 wherein filtering the approver list to include only suitable approvers includes applying a weighted combination of availability and context information to select approvers for receiving the resource access request.

17. The access-control computing device of claim 12 wherein sending the resource access request to the computing device of the preferred approver comprises identifying a notification type appropriate for the preferred approver and using the appropriate notification type.

* * * * *